Sept. 14, 1948.  J. W. LEIGHTON  2,449,306
KINGPIN ASSEMBLY

Filed July 24, 1944  3 Sheets-Sheet 1

INVENTOR.
John W. Leighton.
BY
Harness, Dickey & Pierce.
ATTORNEYS.

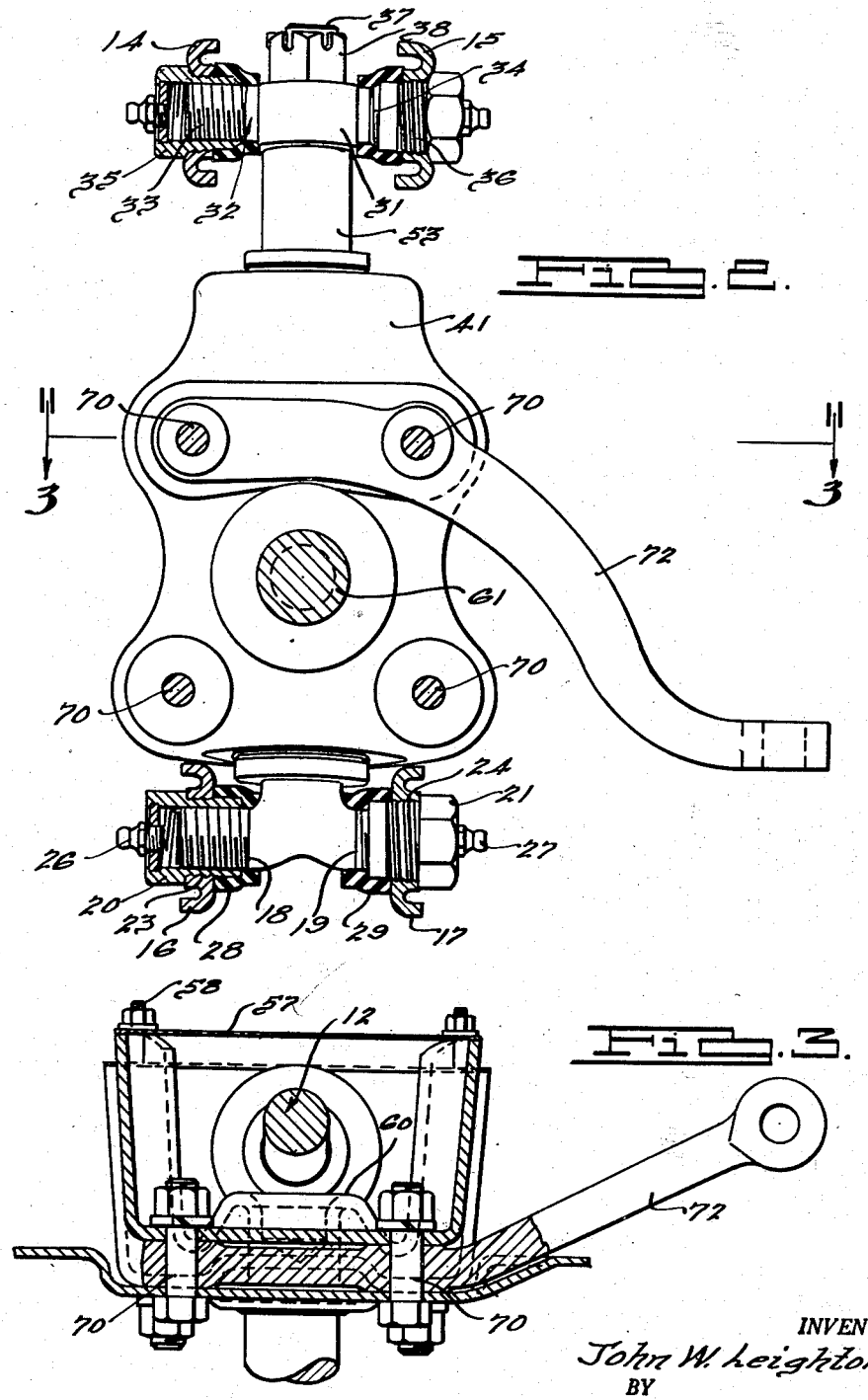

Sept. 14, 1948.   J. W. LEIGHTON   2,449,306
KINGPIN ASSEMBLY
Filed July 24, 1944   3 Sheets-Sheet 3
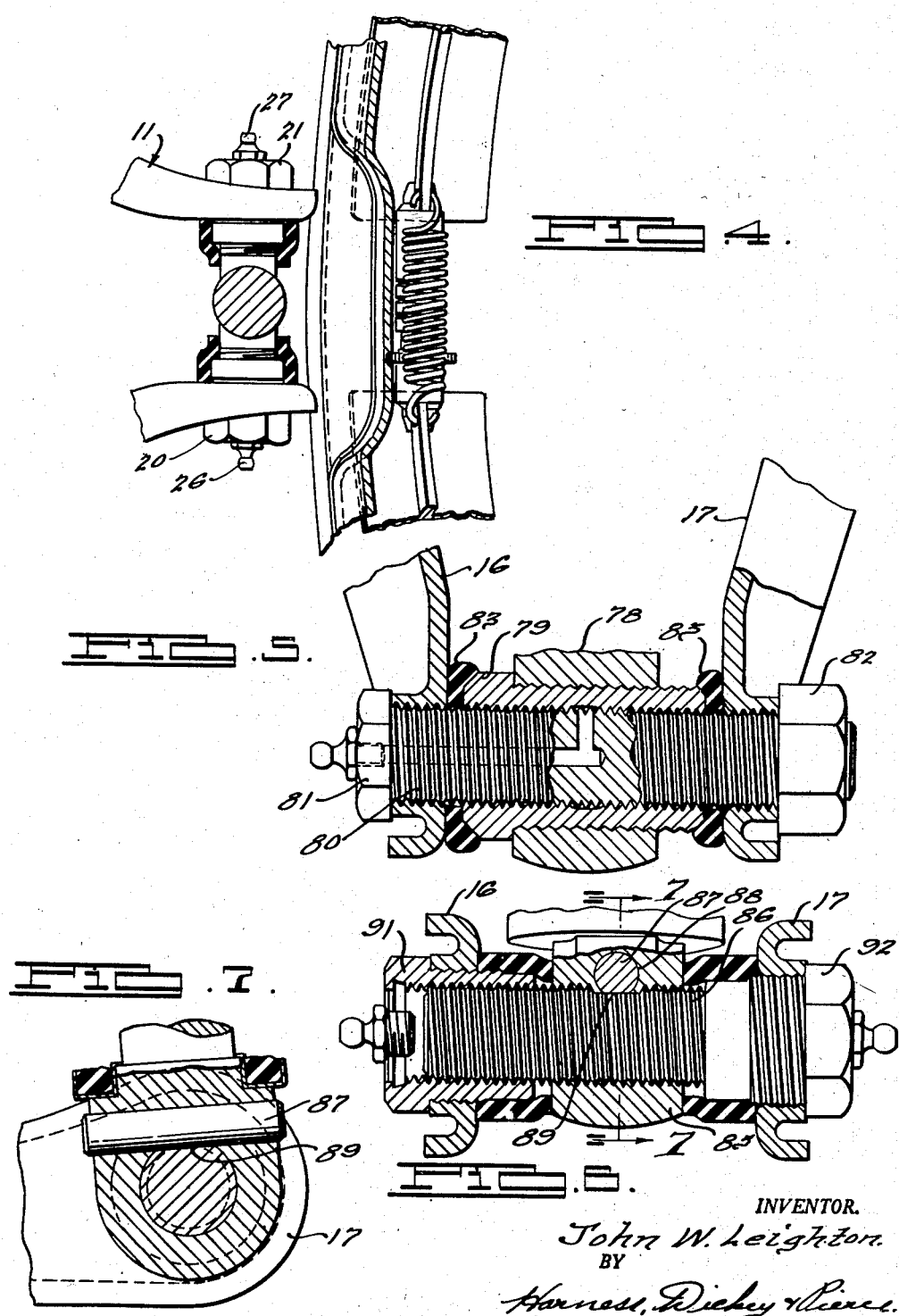
INVENTOR.
John W. Leighton
BY
Harness, Dickey & Pierce.
ATTORNEYS.

Patented Sept. 14, 1948

2,449,306

UNITED STATES PATENT OFFICE 2,449,306

KINGPIN ASSEMBLY

John W. Leighton, Port Huron, Mich.

Application July 24, 1944, Serial No. 546,412

4 Claims. (Cl. 280—96.1)

The invention relates generally to motor vehicles and it has particular relation to an individual wheel suspension.

One object of the invention is to provide in an individual wheel suspension an improved axle supporting member adapted to be mounted on a kingpin, which may be manufactured inexpensively from sheet metal.

Another object of the invention is to provide an improved axle support in the form of a sheet metal stamping which may be rigidly connected or welded to the axle.

Another object of the invention is to provide in an individual wheel suspension having upper and lower arms, a combined kingpin and outer connecting link between the arms, and an improved axle support formed from sheet metal which is swingably mounted on the pin.

Another object of the invention is to provide an improved axle support in the form of a sheet metal housing which is shaped to provide bearing supports or retainers.

Another object of the invention is to provide an improved axle support wherein the support comprises a sheet metal housing cooperating in an improved manner with a brake supporting plate for supporting the axle.

Another object of the invention is to provide an improved form of pin or connecting link adapted to extend between the outer ends of the arms of an individual suspension which is so designed that it may be constructed inexpensively from bar stock while still providing transversely arranged bearing ends.

Another object of the invention is to provide an improved wheel mounting and supporting arrangement, including a pivotal connection having improved means for effecting caster and camber adjustments.

Other objects of the invention will become apparent from the following specification, from the drawings relating thereto, and from the claims hereinafter set forth.

For a better understanding of the invention, reference may be had to the accompanying drawings, wherein:

Figure 2 is a cross-sectional view taken substantially along the line 2—2 of Figure 1.

Figure 3 is a cross-sectional view taken substantially along the line 3—3 of Figure 2.

Figure 4 is a cross-sectional view taken substantially along the line 4—4 of Figure 1.

Figure 5 is a cross-sectional view of another form of pivotal connection which may be employed between the kingpin and the lower wheel supporting arm.

Figure 6 is a view similar to Figure 5, illustrating another form of pivotal connection which may be employed between the kingpin and the lower arm.

Figure 7 is a cross-sectional view taken substantially along the line 7—7 of Figure 6.

Figure 1:
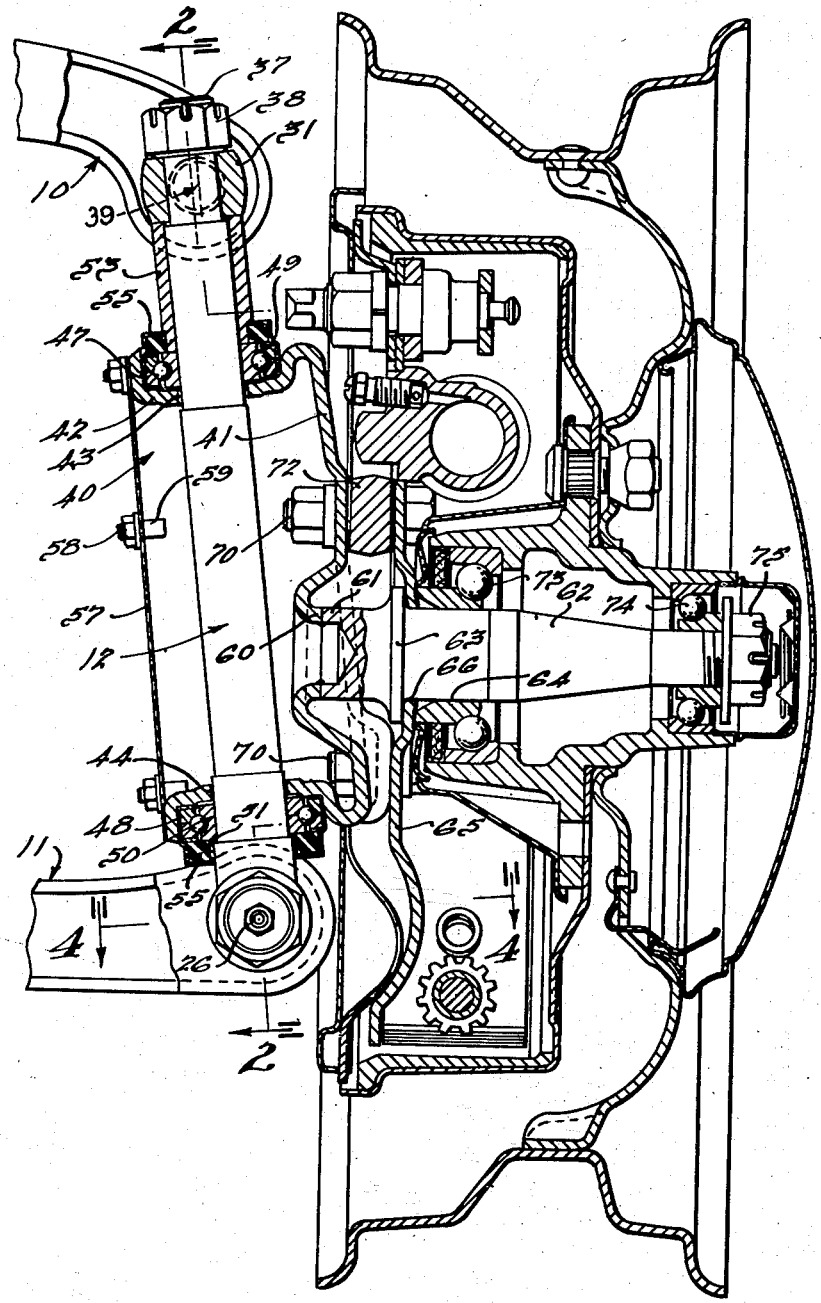
Figure 1 is a vertical view in cross section showing an individual suspension and wheel supporting means constructed according to one form of the invention.

Referring to Figures 1 and 2, the wheel suspension generally comprises an upper arm 10, a lower arm 11 and a vertically extending kingpin 12 disposed between the outer ends of the arms. As best seen in Figure 2, the upper arm comprises two parts 14 and 15 and these extend inwardly and normally in diverging relation, and have their inner ends pivotally connected to the vehicle frame. Similarly, the lower arm comprises two parts 16 and 17 which have their inner ends pivotally connected to the vehicle frame.

The pin 12 is formed from round bar stock and at its lower end it is provided with oppositely directed but aligned trunnions 18 and 19, and these are externally threaded so as to provide a threaded bearing. Such trunnions may be formed by axially upsetting the end of a length of round bar stock or they may be formed by suitable forging operations. The trunnions are threaded into bushings 20 and 21, and have shallow external threads 23 and 24 engaging openings in the arms 16 and 17 respectively. Grease fittings 26 and 27 are provided at the outer ends of the bushings, and at the inner ends of such bushings rubber sealing sleeves 28 and 29 are employed to prevent the escape of lubricants.

The upper end of the pin 12 extends through an eye portion 31 of a hinge pin 32, and opposite ends of the pin are threaded as indicated at 33 and 34. Such threaded ends engage internally threaded bushings 35 and 36 which are associated with the arms 14 and 15 in substantially the same manner as the bushings are associated with the lower arm. Above the eye portion 31, the kingpin 12 has a threaded end 37, and a nut 38 on the threaded end engages the eye portion at its upper side.

Attention is directed to the fact, as best seen in Figure 1, that the axis of the pin 12 is slightly offset from the axis of the trunnions 33 and 34 as indicated at 39, and from this it follows that if the pin 32 is turned through 180°, the upper end of the kingpin 12 may thereby be shifted inwardly towards the vehicle frame an amount corresponding to substantially twice the distance between the axis of the kingpin and the axis of the trunnions. The camber of the wheel may be thereby varied to this extent. Also the caster of the wheel may be varied by turning the pin 32 so as to cause it to travel lengthwise in the threaded bushings. Such adjustment of the pin 32 can be easily effected by removing the nut 38, raising the arm 10, effecting the turning movement of the pin, and then reassembling the parts.

The intermediate portion of the kingpin supports a sheet metal housing 40 which is generally cup shaped so as to provide a base 41 and a rim or flange 42. This flange has an upper opening 43 and a lower opening 44 aligned with the upper opening, and the kingpin extends through these openings. Around the openings 43 and 44 the flange 42 is shaped to provide bearing recesses 47 and 48, and these respectively receive ball bearings 49 and 50. It will be noted that the inner race of the lower bearing rests on a shoulder 51 on the kingpin. A load supporting sleeve 53 is provided on the kingpin between the bearing 49 and the eye portion 31 of the upper pin 32, so that the weight of the vehicle which is normally taken through the lower arm is carried by the pin 12, sleeve 53 and the housing 40. Tightening of nut 38 as desired holds the parts in position on the kingpin between the nut and the shoulder 51. Suitable lubricant sealing rings 55 are provided below and above the bearings 49 and 50, respectively.

The base 41 of the housing 40 is disposed at the outer side of the suspension, while the inner side of the housing is closed by means of a cover plate 57 secured by bolt fasteners 58 to the flange 42. Such bolt fasteners may include studs 59 welded to the inner side of the flange 42. For fastening a wheel axle to the base 41 of the housing, the latter has an outwardly directed tubular projection 60 and the end of this projection abuts the inner tubular end 61 of an axle 62. Along the line of contact, the axle and projection 62 are welded so that the axle becomes a permanent part of the sheet metal housing.

In spaced relation to the housing, the axle has an annular collar 63 and outwardly of this collar it has a cylindrical bearing surface 64. A brake supporting plate 65 has a central opening 66 closely fitting the cylindrical portion 64 of the axle and around the opening the plate is in contact with the outer side of the collar. Radially outwardly from the collar, the plate 65 is firmly connected at four points by bolts 70 to the base of the housing. A steering arm 72 may be fastened to the assembly by disposing it between the plate and housing, and securing it thereto by the upper pair of bolts. The remainder of the wheel assembly is of generally standard construction and includes an inner bearing, an outer bearing 74 and a nut 75 on the outer end of the axle for holding the wheel and bearings in place. It may be noted that the inner race of the inner bearing 73 abuts the plate 65 so as to hold it against the collar 63 on the axle.

Now referring to Figure 5, instead of using the T-shaped lower end of the kingpin, the latter has an eye 78 which receives a bushing 79 threaded thereinto by shallow threads such as previously mentioned. This bushing is internally threaded and has threaded bearing engagement with a threaded pin 80, which in turn is threaded through the arms 16 and 17. A head 81 on one end of the pin and a nut 82 on the other serve to lock the pin in position. Rubber sealing rings 83 at opposite ends of the bushing seal the threaded bearing against escape of lubricant.

In Figure 6, the lower end of the pin similarly has an eye 85, but in this case the eye is internally threaded and a threaded pin 86 is threaded through the eye. The eye and pin are locked together for rotation by a flat-sided pin 87 disposed in a transverse opening 88 in the eye which engages a flat 89 on the pin 86. At opposite ends, the pin 86 is threaded into bushings 91 and 92 which, in turn, are threaded by means of shallow threads through the arms 16 and 17.

From the foregoing, it is evident that the kingpin may be manufactured from round bar stock in an inexpensive manner and that the threaded bearings at the upper and lower ends of the pin may be manufactured and assembled efficiently and also inexpensively. It is also evident that invention provides an improved threaded bearing which, in a simple manner, permits changing the caster and camber of the wheel. Furthermore, this bearing is of such character that it may be easily assembled with the kingpin.

It is evident, too, that the wheel supporting housing and axle combined therewith may be manufactured economically by forming the housing from sheet metal in an inexpensive manner, and then welding the axle thereto. In forming the housing, the recesses for receiving the ball bearings may be readily provided by forming operations, and, accordingly, the housing and axle may be easily associated with the kingpin by placing the bearings in position and then inserting the pin through the openings in the housing. It is evident, too, that the housing provides a closed space which may be filled with lubricant if desired. It is apparent also that by connecting the braking plate 65 to the housing and also to the axle in spaced relation to the inner end of the latter, the axle is rigidly and strongly supported at two points or locations. Thus, bending strains adjacent the wall of the housing are substantially avoided. The shape of the housing is such as to provide great strength and rigidity.

While more than one form of the invention has been illustrated and described, it should be apparent to those skilled in the art that various modifications may be made without departing from the spirit of the appended claims.

What is claimed is:

1. A combined wheel axle and kingpin support comprising a cup shape sheet metal housing having aligned openings in opposed walls with the metal around the openings formed to support kingpin bearings, an axle secured at one end to the base of the housing and projecting therefrom, and a plate element mounted on the axle at a point spaced from said base and also being secured to the base.

2. A combined wheel axle and kingpin support comprising a cup shape sheet metal housing having aligned openings in opposite walls for receiving a kingpin, an axle secured to and projecting from the base of the housing and having a collar spaced from said base, a plate having an opening receiving the axle at the outer side of the collar with the opening closely fitting the axle next to the collar and the plate substantially abutting the side of the collar, and means securing the radially outer part of the plate to the housing.

3. A combined wheel axle and kingpin support comprising a cup shape sheet metal housing having openings in opposed walls for receiving a kingpin, an axle secured at one end to the base of the housing and projecting therefrom, and a plate disposed crosswise of and mounted on the axle at a point spaced from the base and having its radially outer portion connected to said base.

4. For use in an individual wheel suspension having upper and lower arms, a kingpin adapted to extend vertically between the arms and to be pivotally connected thereto, and a wheel mounting member journaled on said kingpin and comprising a sheet metal element having a vertically disposed base portion, rim portions projecting from the edges of the base portion and provided with openings through which the pin projects, and an axle secured to the base, said rim having indented sockets around said openings adapted to receive antifriction bearings.

JOHN W. LEIGHTON.

REFERENCES CITED

The following references are of record in the file of this patent:

UNITED STATES PATENTS

| Number | Name | Date |
|---|---|---|
| 1,446,351 | O'Brien | Feb. 20, 1923 |
| 2,070,817 | Wagner | Feb. 16, 1937 |
| 2,115,918 | Slack | May 3, 1938 |
| 2,122,476 | Leighton | July 5, 1938 |
| 2,144,162 | Leighton | Jan. 17, 1939 |
| 2,222,265 | Parker | Nov. 19, 1940 |
| 2,265,839 | Hufferd et al. | Dec. 9, 1941 |
| 2,277,613 | Swenson | Mar. 24, 1942 |
| 2,297,901 | Leighton | Oct. 6, 1942 |
| 2,301,152 | Strehlow | Nov. 3, 1942 |
| 2,311,125 | Phelps | Feb. 16, 1943 |